United States Patent [19]
Schnee et al.

[11] 3,865,683
[45] Feb. 11, 1975

[54] COVERED ASBESTOS-CEMENT PRODUCTS

[75] Inventors: Karl Schnee, Dornigheim; Dieter Tichy; Friedrich Engelhardt, both of Frankfurt, all of Germany

[73] Assignee: Cassella Farbwerke Mainkur Aktiengesellschaft, Frankfurt (Main), Germany

[22] Filed: Sept. 12, 1972

[21] Appl. No.: 288,276

[30] Foreign Application Priority Data
Sept. 15, 1971 Germany............................ 2146101

[52] U.S. Cl................ 161/205, 156/330, 156/331, 156/335, 161/257, 161/258, 161/263, 161/264, 260/831, 260/834, 260/844, 260/851, 260/856
[51] Int. Cl....................... B32b 13/12, C08g 37/20
[58] Field of Search ........... 161/205, 257, 258, 263, 161/264; 156/335; 260/844, 851, 856

[56] References Cited
UNITED STATES PATENTS

| | | | |
|---|---|---|---|
| 2,726,232 | 12/1955 | Upson | 260/82.1 |
| 2,890,148 | 6/1959 | Dede, Jr. | 161/258 |
| 3,037,963 | 6/1962 | Christenson | 260/80.7 |
| 3,313,675 | 4/1967 | Petropoulos et al. | 161/257 |
| 3,511,748 | 5/1970 | Heeb et al. | 161/205 |
| 3,580,777 | 5/1971 | Hartzell et al. | 161/205 |
| 3,663,353 | 5/1972 | Long et al. | 161/263 |
| 3,753,827 | 8/1973 | Kober | 161/258 |
| 3,769,143 | 10/1973 | Kulesza | 161/263 |

*Primary Examiner*—William J. Van Balen
*Assistant Examiner*—Charles E. Lipsey
*Attorney, Agent, or Firm*—Connolly and Hutz

[57] ABSTRACT

Adhesive laminated asbestos-cement base and resin impregnated covering material wherein the adhesive comprises a mixture of (a) a reactive polymer of olefinically unsaturated monomers which is miscible with the impregnating resin and contains functional groups which react with the impregnating resin during curing, and (b) an impregnating resin.

3 Claims, No Drawings

COVERED ASBESTOS-CEMENT PRODUCTS

Plywood, wood chip board and wood fiber board laminated with a decorative paper are well known. For their large scale production, a decorative paper saturated with a laminating resin is placed on the boards and firmly bonded thereto by pressing under elevated pressure and elevated temperature. As laminating resins there are used melamine, urea and phenolic resins. In place of the decorative paper, other covering materials may be employed, such as textile fabrics and fleeces of polyester or glass.

Using the available methods of operating and the available resins, however, it proved impossible to produce in the same manner a water and temperature resistant coating on asbestos-cement products such as plates by the lamination of a decorative paper or of another covering material. The coating of such asbestos-cement products with the customary laminating resin impregnated decorative paper by pressing at elevated temperatures failed in that a sufficient adhesion of the decorative paper to the asbestos-cement base could not be achieved.

By "asbestos-cement base," as used herein, is meant products of the type which may be produced in accordance with the process described in German Pat. No. 162,329. In accordance with that procedure, an aqueous slurry of asbestos, e.g., chrysotile, and cement, e.g., Portland cement, having an asbestos to cement ratio of, for example, 1 : 6 is deposited onto a wire die face which may be subjected to vacuum on the reverse side and there is thereby formed a fibrous cement fleece. The fleece may then be cut to desired shapes and pressed in stack formation under pressures of the order of about 200 kg.cm² for from 24 to 48 hours. After removal from the stacked form, the bases are stored from one to two months. Curing or setting of the cement may be further facilitated by the application of heat. More refined methods of forming such bases include the use of suction dies which are in the shape of the final desired article, such as a plate, and this may be followed up by additional water removal using a mating pressing die.

It has now been found that covering materials, particularly decorative papers, can be laminated, even to asbestos-cement products as bases, with excellent adhesion and good temperature stability if, between the latter's surface and the covering material, there is placed in a thin layer an adhesive agent comprising a mixture of a customary impregnating resin with a reactive polymer, and the covering material, pretreated in the cutomary manner, is laminated onto the asbestos-cement base under elevated pressure and elevated temperture.

As used usd in describing and claiming the present invention, the expression "reactive polymer" is understood to mean a polymer of olefinically unsaturated monomers, which is miscible with the impregnating resin and contains built in functional groups in the macromolecule which react with the impregnating resin during the curing procedure. Such functional groups are, for example, hydroxyl, amino, amido, carboxyl, epoxy and keto groups.

Suitable reactive polymers are obtained, for example, by the copolymerization of:

A. 20–80 percent by weight of at least one member of the group consisting of esters of acrylic and methacrylic acids with 1 to 8 carbon atom containing alkanols such as the methyl, ethyl, butyl and isooctyl esters, B. 0–50 percent by weight of at least one member of the group consisting of acrylonitrile, styrene, vinyl toluene, vinyl chloride and vinyl acetate, C. 0.5–30 percent by weight of at least one reactive olefinically unsaturated monomer, i.e., olefinically unsaturated monomers which contain groups that can react with the impregnating resin, such as acrylamide, methacrylamide, N-methylolacrylamide, N-methylolmethacrylamide as well as the alkyl ethers of these methylol compounds having 1 to 8 carbon atoms in the etherifying alkyl moiety, oxyethyl and oxypropyl esters of acrylic and methacrylic acid, oxyethylated semi-esters of maleic acid and fumaric acid, glycidylmethacrylate, allylglycidyl ether and diacetone acrylamide and D. 5–45 percent by weight of at least one hydrophilic monomer such as acrylic acid, methacrylic acid, crotonic acid, maleic acid, fumaric acid, their alkali metal, ammonium and amine salts, basic esters of acrylic and methacrylic acid such as dimethylaminomethacrylic acid ethyl ester, N-($\beta$-phenethyl)-2-aminoacrylic acid ethyl ester, N-($\beta$-phenethyl)-2-aminomethacrylic acid ethyl ester, N-(propionitrile)-2-aminoacrylic acid ethyl ester, N-(propionitrile)-2-aminomethacrylic acid ethyl ester, and basic ethers such as diethylaminoethanolvinyl ether. The basic esters and the basic ethers may also be present in the form of their salts, e.g., as acetate or as quaternary compounds.

The components specified under (D) assure that the reactive polymer is miscible with the impregnating resin present in aqueous solution.

The polymerization of (A)–(D) is carried out in a manner known per se at temperatures of between 20° and 130°C, and preferably 50° and 90°C. Suitable polymerization media are water and organic solvents miscible with water, e.g., methanol, ethanol, isopropanol, tertiary butanol, acetone, dioxane, tetrahydrofuran, dimethylformamide, butylglycol and methylglycol, etc., as well as mixtures of such water-miscible solvents with each other and/or with water. Suitable as polymerization catalysts are peroxide compounds, e.g., benzoylperoxide, acetylperoxide, tertiary butyl hydroperoxide or alkali or ammonium peroxodisulfate. Redox catalyst systems may also be used, e.g., N-p-tolylsulfonomethylcarbamic acid methylester and ammonium peroxodisulfate. The addition of co-catalysts, such as dibutylaminhydrochloride or traces of $Cu^{++}$ is advantageous.

For the preparation of the adhesive agent, the reactive polymer is mixed with the customary impregnating resin in a weight ratio of 25 : 75 to 75 : 25, based on the solid content. Aqueous solution of the known amino or phenolic resins may be used as the impregnating resin: Suitable, for example, are aqueous solutions of melamine-formaldehyde, urea-formaldehyde, phenol-formaldehyde, thiourea-formaldehyde resins and mixtures thereof.

An addition of bisdiene resins has been shown to be advantageous. Bisdiene resins are oligomeric biscyclopentadienyl compounds which are formed by reacting cyclopentadienyl-sodium with an aliphatic or araliphatic dihalide according to the following reaction scheme:

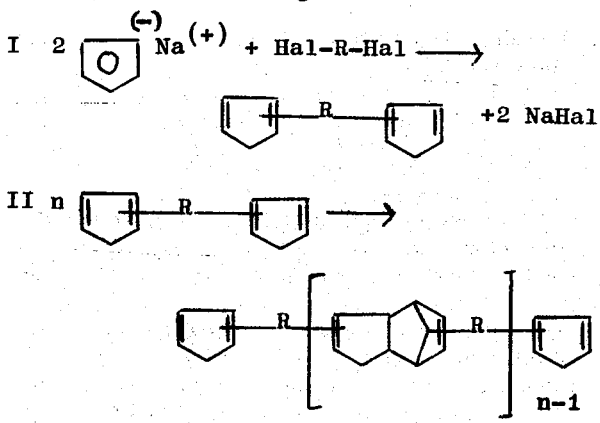

wherein Hal is chlorine or bromine and the bridging member R may, for instance, be of an aliphatic or araliphatic nature and $n$ is a number of 2 to 8. As aliphatic bridging members R there may, for instance, stand the radicals $-(CH_2)-$ for $m = 1$ to 12 and the araliphatic bridge members may be the radicals

and

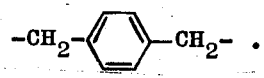

The preparation of a bisdiene resin by means of the p-xylylene radical as bridge member is described in U.S. Pat. No. 2,726,232. Bisdiene resins with other bridge members may be prepared in an analogous manner.

The adhesive agent, comprising a mixture of the reactive polymer and of the impregnating resin, with the addition of the bisdiene resins of necessary, is applied in a thin layer to the surface of the asbestos-cement base. This may take place, for example, by pouring, spraying, or brushing and subsequent drying at room temperature or at elevated temperature or by the use of a supporting layer. The supporting layer may, for example be a fabric, fleece or paper. The cheapest supporting layer is soda kraft paper. In using a supporting layer, a soda kraft paper, for example, having a weight of 80–120 g/cm² is impregnated, by dipping, with the adhesive agent, and the paper is subsequently dried to about 8–12 percent residual moisture. Upon drying, which may take place continuously in a drying oven at 100°–160°C, the portion of the adhesive agent solids should amount to 40–50 percent, referring to the paper end weight. The portion of the adhesive agent solids upon the dipping of the paper may be regulated by doctor blades or with an air wiper. The residual moisture may be affected by the speed with which the paper strip is conducted through the drying oven and/or by the regulation of the drying temperature. The intermediate paper thus obtained is then placed onto the asbestos-cement base.

Regardless of whether the adhesive agent, consisting of the mixture of the reactive polymer and of the impregnating resin, with the addition of the bisdiene resin if necessary, is applied to the surface of the asbestos-cement base directly or by using a supporting layer impregnated with the adhesive agent, a covering material, e.g., a textile fabric or a fleece of polyester or glass threads or fibers, and preferably a decorative paper such as usd in the decorative coating of articles consisting of wood pulp, is pretreated and laminated to the prepared surface of the asbestos-cement base.

The covering material may be impregnated with a known amino or phenolic resin. For example, decorative paper — according to the procedure customary in the decorative coating of wood pulp plates — is impregnated to a resin proportion of 55–58 percent in a 53–55 percent aqueous solution of a melamine-formaldehyde condensate having a molar ratio of melamine to formaldehyde 1 : 1.5 to 1 : 3.5 with the addition of known modification agents such as p-toluene sulfonamide, etc., and then dried to a residual moisture of about 5–6.5 percent.

A bilateral coating of asbestos-cement plates in multistage presses may take place by the use of decorative paper and intermediate paper in the following arrangement:

1 asbestos-padding, 2–5 mm thick
1 steel plate mold, hard chrome-plated, polished or matte
1 decorative paper, impregnated with melamine resin
1 paper, impregnated with adhesive agent
1 asbestos-cement plate
1 paper, impregnated with adhesive agent
1 decorative paper, impregnated with melamine resin
1 steel plate mold, hard chrome-plated, polished or matte
1 asbestos padding
1 conveying sheet The pressure applied is 15–60 kp/cm², the temperature 120°–170°C. The curing time is 6–20 minutes, depending on the temperature selected. The mold is then cooled to about 70° to 80°C and opened.

The decoratively coated asbestos-cement plates obtained in such a manner are resistant to boiling water, to temperature stresses up to 160°C and to the alternate effects of water and elevated temperature (130°C).

EXAMPLE 1

In an aqueous solution consisting of:
83 parts by weight of a reactive polymer
100 parts by weight of a 75 percent aqueous solution of trimethylol melamine, which is about 90 percent methyl-etherified
50 parts by weight water
0.2 percent p-toluene sulfoacid, 50 percent solution in water, an 80 g/m² heavy soda kraft paper is impregnated to a solids content of about 50 percent (referring to paper and weight) and a residual moisture content of about 8–10 percent (5 min./160°C) and then dried. This foil is placed between an asbestos-cement plate and a decorative paper impregnated in melamine resin.

The composition is pressed between chrome-plated steel plate molds of a multi-stage press at 140°C and a pressure of 25 kp/cm² for a curing time of 10 minutes. The mold is opened after recooling to about 60°–80°C.

The reactive polymer was prepared from a mixture placed in a polymerization vessel of 2 liter capacity and consisting of:
260 g acrylic acid ethyl ester
30 g acrylonitrile
45 g acrylamide
30 g acrylic acid
700 ml methanol
300 ml deionized water
0.5 g dibutylaminohydrochloride
10 g N-p-tolylsulfonomethyl carbamic acid methylester and 0.1 ml aqueous CuSO₄ solution containing 40yCu²⁺ in 1 ml. While stirring at 50°C, a solution of 2.0 g ammonium peroxodisulfate in 20 ml water was added dropwise into the reaction mixture. Polymerization began almost immediately, the temperature of the reaction mixture rising to 70°–75°C and a weak reflux setting in. After completion of the polymerization reaction, the polymer was stirred for 2 hours at 70°C. Upon cooling to room temperature, in the course of about 10 minutes, there are added while stirring, 150 ml 20 percent aqueous ammonia solution. A viscous polymer solution was obtained with a solids content of 29.8 percent.

EXAMPLE 2

An aqueous solution consisting of:
167 parts by weight of a reactive polymer
77 parts by weight of a phenol-formaldehyde resin, 60 percent aqueous solution, molar ratio of phenol too formaldehyde = 1 : 1.3.
is sprayed uniformly with a spraygun on an asbestos-cement plate in such a thickness that about 120 g solids are present per square meter.

The sprayed plate is dried in the air for about 2–4 hours and subsequently coated with a decorative paper in accordance with the method described in Example 1.

The reactive polymer was prepared as described in Example 1.

EXAMPLE 3

An aqueous solution consisting of:
83 parts by weight of a reactive polymer
136 parts by weight of a 55 percent aqueous solution of a melamine-urea formaldehyde condensate, molar ratio of melamine to urea to formaldehyde = 1 : 1, 1 : 4,
is simultaneously brushed onto an asbestos-cement plate (140 g/m² solids) and dried for 10 minutes at 100°C. Subsequently, a decorative paper is laminated to the plate in accordance with Example 1.

The reactive polymer was prepared as follows: A mixture of -
200 g acrylic acid ethyl ester
50 g methacrylic acid methyl ester
100 g maleic acid butyl oxyethyl ester
30 g acrylic acid
700 ml tertiary butanol and
300 ml water, deionized,
was heated to 70°C and polymerized by the dropwise addition of 20 ml of a 10 percent aqueous solution of ammonium peroxodisulfate. After completion of the reaction, stirring is continued for 2 hours at 70°C, and then after cooling to room temperature, there are added 60 ml of a 20 percent aqueous ammonia solution. The viscous polymer solution had a solids content of 29.1 percent.

EXAMPLE 4

In an aqueous solution, consisting of:
40 parts by weight bisdiene resin X 355/2558 of Ciba, 80 percent solution in xylene
110 parts by weight reactive polymer
44 parts by weight of a trimethylolmelamine condensate, 75 percent aqueous solution, which is about 90 percent methyl etherified
50 parts by weight dimethyl formamide, a soda kraft paper of about 80 g/m² weight was impregnated to a solids content of about 67 percent and a residual moisture of 8–12 percent and then dried. Further processing was in accordance with Example 1.

In the preparation of the reactive polymer, polymerization was carried out in the customary manner at 50°C by the dropwise addition of a solution of 2.0 g potassium peroxodisulfate dissolved in 50 ml H₂O, into a mixture of:
155 g acrylic acid ethyl ester
30 g acrylamide
70 g dimethylaminomethacrylic acid ethyl ester
28 g glacial acetic acid
1.0 g formaldehyde sulfoxylate
500 ml methanol and
220 ml water, deionized
The resulting viscous polymer solution had a solids content of 25.6 percent.

EXAMPLE 5

In a solution consisting of:
184 parts by weight of a reactive polymer
71.5 parts by weight of a 70 percent aqueous solution of a melamine-phenol-formaldehyde mixed condensate; molar ratio of melamine to phenol to formaldehyde = 1 : 0.7 : 3.6,
a soda kraft paper having about 100 g/m² weight is impregnated to a solids content of 40–45 percent and dried at 100°C to a residual moisture content of 7–9 percent.

The intermediate paper impregnated with the adhesive agent is subsequently placed between the asbestos-cement plate and decorative paper and pressed in accordance with Example 1.

The reactive polymer was prepared as described in Example 1.

The decorative asbestos-cement plates prepared in accordance with Examples 1 to 5 are flawlessly coated.

EXAMPLE 6

An 80 g/m² weight decorative paper, impregnated in melamine resin solution, with a resin proportion of about 60 percent and a residual moisture content of about 5.5 percent, is pressed onto an asbestos-cement plate without adhesive agent. Pressing time: 10 minutes; temperature: 145°C; pressure: 25 kp/cm². The mold is opened after recooling to about 70°C.

After the mold is opened, the hardened decorative paper film may be removed from the asbestos-cement plate. There is practically no adhesion of the decorative paper to the asbestos-cement plate.

What is claimed is:

1. A unitary product comprising an asbestos-cement base having at least one surface thereof laminated to a resin impregnated covering material with a heat and pressure cured adhesive agent, said adhesive agent comprising an aqueous solution of a mixture of a reactive polymer and an impregnating resin in a weight ratio, based on the solid contents of said adhesive agent, of 25:75 to 75:25, the resin impregnant of said covering material and the impregnating resin of said adhesive agent being at least one member selected from the group consisting of melamine-formaldehyde, urea-formaldehyde, phenol-formaldehyde, thiourea-formaldehyde resins and mixtures thereof, and said reactive polymer comprising a copolymer of A. 20–80 percent by weight of at least one member of the group consisting of esters of acrylic and methacrylic acids with 1 to 8 carbon atom containing alkanols, B. 0–50 percent by weight of at least one member of the group consisting of acrylonitrile, styrene, vinyl toluene, vinyl chloride and vinyl acetate, C. 0.5–30 percent by weight of at least one olefinically unsaturated monomer selected from the group consisting of acrylamide, methacrylamide, N-methylolacrylamide, N-methylolmethacrylamide, alkyl ethers of said methylol compounds having 1 to 8 carbon atoms in the etherifying alkyl moiety, oxyethyl and oxypropyl esters of acrylic and methacrylic acid, oxyethylated semi-esters of maleic and fumaric acid, glycidylmethacrylate, allylglycidyl ether and diacetone acrylamide, and D. 5–45 percent by weight of at least one hydrophilic monomer selected from the group consisting of acrylic acid, methacrylic acid, crotonic acid, maleic acid, fumaric acid, their alkali metal, ammonium and amine salts, dimethylaminomethacrylic acid ethyl ester, N-(β-phenethyl)-2-aminoacrylic acid ethyl ester, N-(β-phenethyl)-2-aminomethacrylic acid ethyl ester, N-(propionitrile)-2-aminoacrylic acid ethyl ester, N-(propionitrile)-2-aminomethacrylic acid ethyl ester, and diethylaminoethanolvinyl ether.

2. The unitary product of claim 1 wherein a supporting layer is embedded within said cured adhesive.

3. The unitary product of claim 1 wherein said adhesive agent contains a bisdiene resin of the formula

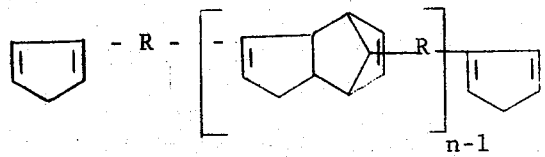

wherein the bridging member R is of an aliphatic or araliphatic nature and n is a number of 2 to 8.

* * * * *